United States Patent [19]
Scott

[11] Patent Number: 5,101,945
[45] Date of Patent: Apr. 7, 1992

[54] (CLUTCH-BRAKE PEDAL) BRAKE SYSTEM

[76] Inventor: James S. Scott, P.O. Box 3067, Las Vegas, N. Mex. 87701

[21] Appl. No.: 688,851

[22] Filed: Apr. 22, 1991

[51] Int. Cl.⁵ .................................... F16D 67/04
[52] U.S. Cl. .................................... 192/13 R; 60/562
[58] Field of Search ............ 192/13 R, 13 A; 60/562, 60/591; 303/89; 188/265

[56] References Cited

U.S. PATENT DOCUMENTS

| Re. 20,086 | 9/1936 | Rosiers | 192/13 R X |
|---|---|---|---|
| 1,973,826 | 9/1934 | Schweering | 192/13 R |
| 2,152,949 | 4/1939 | Borde | 192/13 R X |
| 2,285,557 | 6/1942 | Berglund | 192/13 R X |
| 3,143,860 | 8/1964 | Stelzer | 60/562 |
| 3,498,426 | 3/1970 | Nakano | 192/13 R |
| 3,866,727 | 2/1975 | Myers | 192/13 R |
| 4,014,419 | 3/1977 | McKnight | 192/13 R |
| 4,538,710 | 9/1985 | Taig | 192/13 A |
| 4,540,072 | 9/1985 | Suzuki | 192/13 A X |
| 4,658,942 | 4/1987 | Kubota et al. | 192/13 A |

FOREIGN PATENT DOCUMENTS 1425470  2/1976  United Kingdom ............ 192/13 R

Primary Examiner—Leslie A. Braun
Assistant Examiner—Nicholas Whitelaw
Attorney, Agent, or Firm—Robert W. Harris

[57] ABSTRACT

A clutch/brake system for a manual transmission motor vehicle, having an additional brake master cylinder attached to the conventional clutch master cylinder, and associated hydraulic lines and valves whereby depression of the clutch pedal first causes disengagement of the clutch, and then causes engagement of the brakes through engagement of the additional brake master cylinder. The system is particularly useful when starting a vehicle on an upward incline, to allow the operator to prevent the vehicle from rolling backward when one foot must be on the clutch pedal while the other is on the accelerator pedal. The system is also useful in the event that a sudden stop is necessary while the operator is using the clutch pedal for frequent gear shifting, as in heavy traffic.

9 Claims, 5 Drawing Sheets

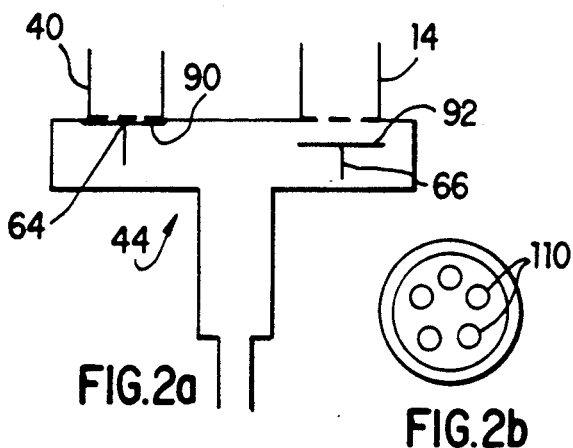
FIG.2a
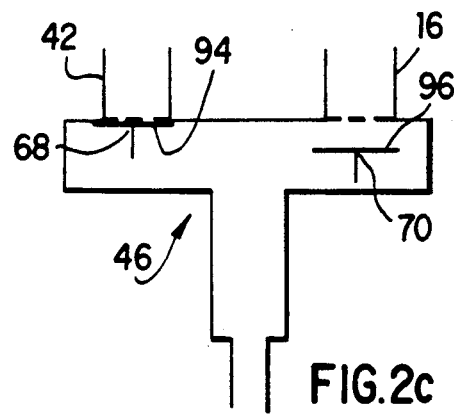
FIG.2c
FIG.2b
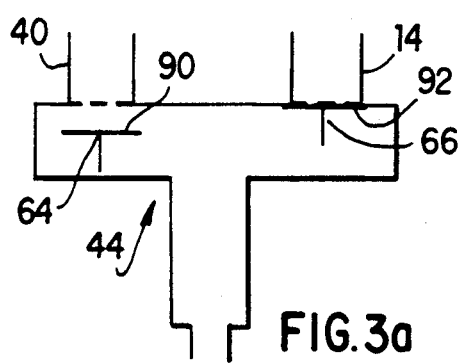
FIG.3a
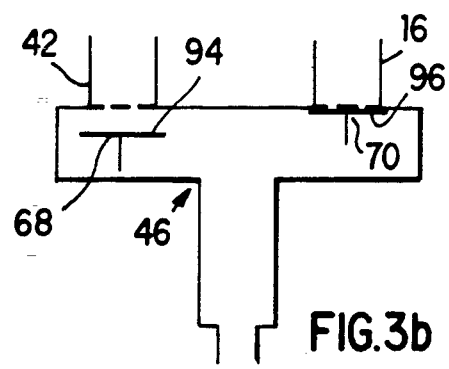
FIG.3b
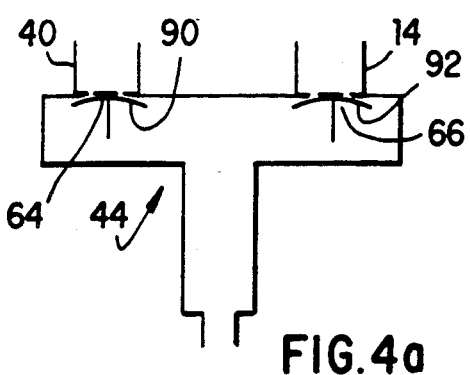
FIG.4a
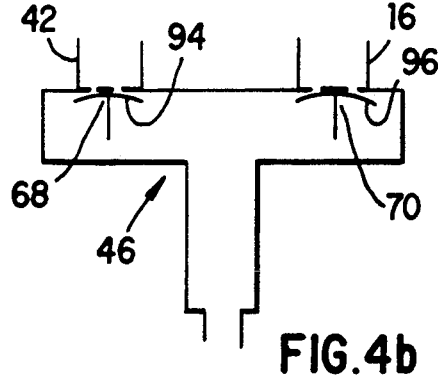
FIG.4b

(CLUTCH-BRAKE PEDAL) BRAKE SYSTEM

BACKGROUND OF THE INVENTION

The invention pertains to devices used for manual transmission motor vehicles, to allow the operator to start up the vehicle while it is parked on an incline, without having the vehicle begin to roll downhill before the operator can begin a controlled acceleration. With a conventional manual transmission vehicle, the operator must, when starting up from a parked position, push down on the clutch pedal with one foot, shift into gear, and push down on the accelerator pedal with the other foot. The clutch pedal foot must be kept on the clutch pedal during shifting into first gear, and into higher gears. Since the other foot must be kept on the accelerator during the initial acceleration when getting underway from a parked position, the operator does not have a foot free to operate the brake pedal. This causes a problem when starting up from a parking position on a hill or other incline. Even if the hand brake had been engaged when the vehicle was parked, the operator must release it to start up. Since the operator does not have a foot free to operate the brake pedal during the initial gear shifting and acceleration, the vehicle will tend to roll downhill, out of control, before the operator can begin a safe, controlled acceleration. So there is a need for a mechanism whereby the operator can apply braking action without having to use the brake pedal, during the start up phase of operation.

Although various other means have previously been devised to accomplish this purpose, including the provision of mechanical linkage devices between the clutch pedal and the brake pedal, as in U.S. Pat. No. 4,538,710 of Taig, the present invention provides a more advantageous mechanism, involving a combination clutch and brake master cylinder (in addition to the conventional brake master cylinder), and a linkage mechanism connecting the clutch pedal to this combined clutch--brake cylinder, whereby the operator, in order to apply the brakes, need only further depress the clutch pedal, after having depressed it sufficiently to disengage the clutch.

The present invention also deals with other problems which are encountered in the operation of a conventional manual transmission vehicle. After the operator has already completed the initial acceleration of the vehicle, frequent up or down gear shifting is necessary as the vehicle is driven in city traffic, due to frequently changing speeds of other vehicles. If another motorist or a pedestrian suddenly pulls out in front of the operator, while the operator is engaged in gear shifting, an accident may result from the extra time required for the operator to put a foot onto the brake pedal, before the brake pedal can be depressed. But with the present invention, since the operator's foot is already on the clutch pedal, and since braking power may be applied by simply further depressing the clutch pedal, without moving a foot from one pedal to another, there is a better chance to avoid such an accident.

The present invention is also relevant to two problems arising in starting and operation of a manual transmission vehicle in cold weather conditions. Without the present invention, when starting a vehicle in cold weather on a slanted home driveway, if the emergency brake doesn't function well to prevent the vehicle from rolling backwards (as some do not), it will be necessary to shift the transmission into neutral, and use the left foot on the brake pedal, while using the right foot on the accelerator to rev and warm the engine. In this situation the starter is turning the engine with thickened, cold oil, and is also turning the main transmission gear. But with the present invention the operator can disengage the clutch and engage the brake with the same clutch pedal. In this way the starter is only turning the engine, so that there is less load on the starter and the battery, and the engine will crank more rapidly to high RPM, and start more easily.

The invention also deals with a cold weather operation problem which frequently occurs in the first few minutes of operation, when the vehicle is stopped at a traffic light on an upward incline, and the engine tends to stop because it hasn't been sufficiently warmed. Without the present invention, it is again necessary to shift into neutral, and use one foot on the brake pedal, to keep the vehicle from rolling backwards, while keeping the other foot on the accelerator. When the light turns green, and the operator depresses the clutch pedal to put the transmission in gear, with the transmission gear rapidly rotating from the engine having been "revved" while waiting at the red light, there is a resulting tendency for "grinding" as the transmission is forced into gear. Although many operators manage to avoid this problem by "riding" the clutch, or partially engaging the clutch just sufficiently to keep the vehicle from rolling backwards without using the brake pedal, this method is unsatisfactory because it causes premature wear of the clutch disc. With the present invention this problem also can be avoided, through use of the same pedal to control both the clutch and braking action.

SUMMARY OF THE INVENTION

Applicant's invention is a clutch-brake system for a manual transmission motor vehicle, particularly useful when the vehicle is being started on an incline. The invention employs a combined clutch and brake master cylinder, in addition to the conventional brake master cylinder. In the preferred embodiment, the combined clutch-brake master cylinder is formed by attaching an additional brake master cylinder to the back of a conventional clutch master cylinder. The invention also employs an adjustable length throw rod, movable by depression of the clutch pedal, which extends beyond the clutch master cylinder, for engagement of the additional brake master cylinder, by further depressing the clutch pedal. Thus with applicant's system, for an adjustable range of clutch pedal position, stepping on the clutch pedal first causes disengagement of the clutch, and then causes engagement of the brakes when the clutch pedal is further depressed, without any need for the operator to step on the brake pedal or use the emergency brake. The system leaves the operator's other foot free for operation of the accelerator pedal, and prevents the vehicle from rolling downhill out of control before the operator has a chance to accelerate and get the vehicle into controlled motion.

The invention includes additional hydraulic brake lines, extending from the additional brake cylinder, toward the individual wheel brake cylinders. These additional brake lines are in parallel to the conventional brake lines connecting the conventional brake master cylinder to wheel brake cylinders, but the two sets of brake lines join at T valve assemblies, before reaching the wheel brake cylinders. The invention also includes alternative means to prevent hydraulic brake fluid from flowing from one brake cylinder to the other, instead of to the wheel brake cylinders. In one preferred embodiment, this means comprises an array of solenoid valves and switches, which close off particular line paths that would otherwise allow cross-cylinder flow of hydraulic fluid, depending upon which brake master cylinder is in operation at a particular time. In another preferred embodiment, the use of several solenoid valves is rendered unnecessary by the use of one-way valves connecting the brake master cylinders with their brake fluid reservoirs.

BRIEF DESCRIPTION OF THE DRAWINGS

FIG. 2a is an enlarged side sectional view of the leftmost T valve assembly of FIG. 1, showing the position of the valve heads when the regular brake master cylinder is engaged, and the additional brake master cylinder is not.

FIG. 2b is a view from below of the portion of the valve body above the rightmost valve head in FIG. 2a, showing the apertures in the valve body through which brake fluid flows.

FIG. 2c is an enlarged side sectional view of the rightmost T valve assembly of FIG. 1, showing the position of the valve heads when the regular brake master cylinder is engaged, and the additional brake master cylinder is not.

FIG. 3a is a view as in FIG. 2a, when the additional brake master cylinder is engaged, and the regular brake master cylinder is not.

FIG. 4a is a view as in FIG. 2c, when the additional brake master cylinder is engaged, and the regular brake master cylinder is not.

FIG. 4a is a view as in FIG. 2a, when both brake master cylinders are engaged.

FIG. 4b is a view as in FIG. 2b, when both brake master cylinders are engaged.

DESCRIPTION OF THE PREFERRED EMBODIMENTS

Figure 1:
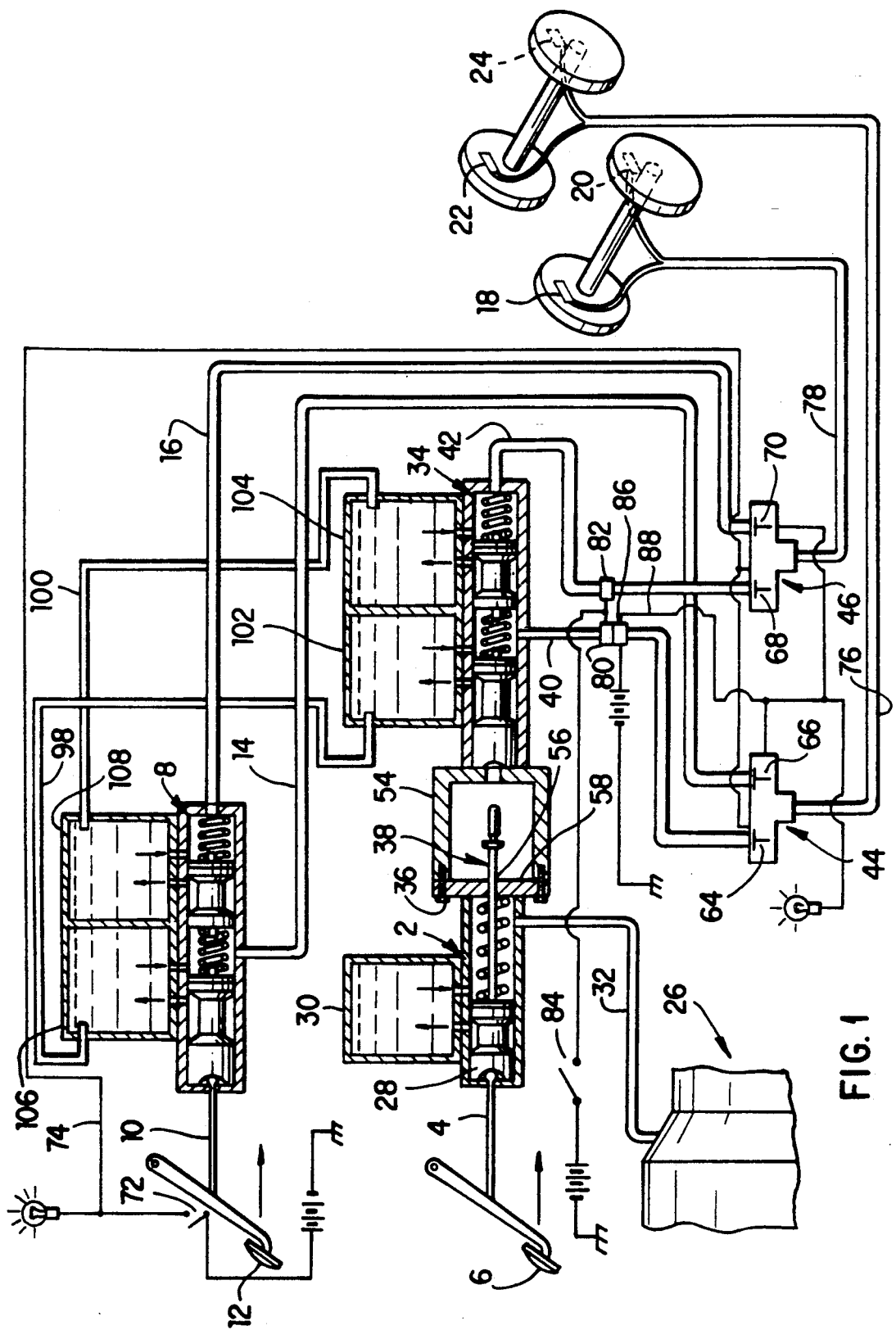
FIG. 1 is a side elevational view of the invention, in which brake lines and associated valves are shown in partially schematic form, and in which solenoid valves controlling flow of brake fluid in the brake lines are shown in sectional view.

Referring now to the drawings, in which like reference numbers denote like or corresponding parts, the principal conventional components, which would be present in the absence of the present invention, are a conventional clutch master cylinder 2, which is activated by a conventional linkage 4 moved by depression of a clutch pedal 6; a conventional brake master cylinder 8, similarly activated by a conventional linkage 10 connected to a brake pedal 12; and brake lines 14 and 16, which, upon activation of brake master cylinder 8, transmit brake fluid to wheel brake cylinders 18, 20, 22, and 24. In the conventional manner of operation of a clutch in a manual transmission vehicle, depression of clutch pedal 6 causes conventional linkage 4 to advance (toward the right in FIG. 1), disengaging the clutch (not shown) in the conventional transmission 26, by means of a piston 28 in clutch master cylinder 2, which piston 28 forces hydraulic fluid from a clutch reservoir 30 into a hydraulic line 32, connected to a conventional clutch slave cylinder (not shown) in transmission 26.

The principal components which distinguish the present invention from a conventional clutch and brake system, are an additional brake master cylinder 34 of conventional brake cylinder design, attached to the rear of clutch master cylinder 2 by means of bolts 36; a throw rod 38, of adjustable length, further described below, extending throughout the length of clutch master cylinder 2, and also extending out the rear of clutch master cylinder 2, which engages additional brake master cylinder 34, as further described below; additional brake lines 40 and 42 for conveyance of hydraulic brake fluid from additional brake master cylinder 34 toward the wheel brake cylinders 18, 20, 22, and 24, and T valve assemblies 44 and 46, further described below, which join brake lines 40 and 14, and brake lines 42 and 16, respectively, and serve to allow hydraulic brake fluid from either or both of additional brake master cylinder 34 and brake master cylinder 8 to flow to wheel brake cylinders 18, 20, 22, and 24, depending upon the mode of operation of the system, as further discussed below.

Figure 5:
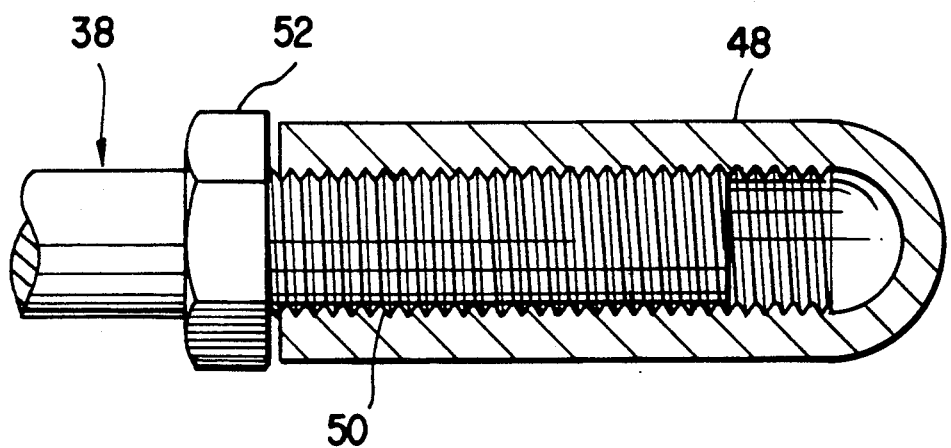
FIG. 5 is an enlarged view, partially in axial section, of the adjustable end of the throw rod.

After the operator has depressed clutch pedal 6 sufficiently to activate clutch master cylinder 2, further depression of clutch pedal 6 causes throw rod 38 to advance toward additional brake master cylinder 34, and to enter brake master cylinder 34, thus engaging the brakes. As best shown in FIG. 5, throw rod 38 is adjustable in length: The end portion 48 of throw rod 38 is a hollow threaded member, which may, by rotation along matching threads 50 on the end of the main body of throw rod 38, be moved longitudinally to vary the effective length of throw rod 38. End portion 48 may be locked at a given longitudinal location on throw rod 38 by use of a lock nut 52. For a sufficient length of throw rod 38, additional brake master cylinder 34 will be engaged to provide brake fluid for operation of wheel brake cylinders 18, 20, 22, and 24, before clutch pedal 6 reaches the floorboard.

The effective length of throw rod 38, determined by the above-described adjustment of the position of end portion 48 of throw rod 38, determines the location of clutch pedal 6 at which additional brake master cylinder 34 will be activated to provide braking action. If throw rod 38 is shortened sufficiently, additional brake master cylinder 34 is not activated until clutch pedal 6 is at or near the floorboard. But if throw rod 38 is lengthened sufficiently, the brakes can be engaged further from the floor board, just past the point of disengagement of clutch. Thus in this configuration, the operator may engage the brakes with very little additional travel of clutch pedal 6, immediately after disengagement of clutch.

The length of throw rod 38 may be adjusted as described above, to suit the comfort and feel of a particular operator. The section 54 between clutch master cylinder 2 and additional brake master cylinder 34 is a chamber open on at least one side, to allow access for adjustment of the length of throw rod 38.

Figure 6:
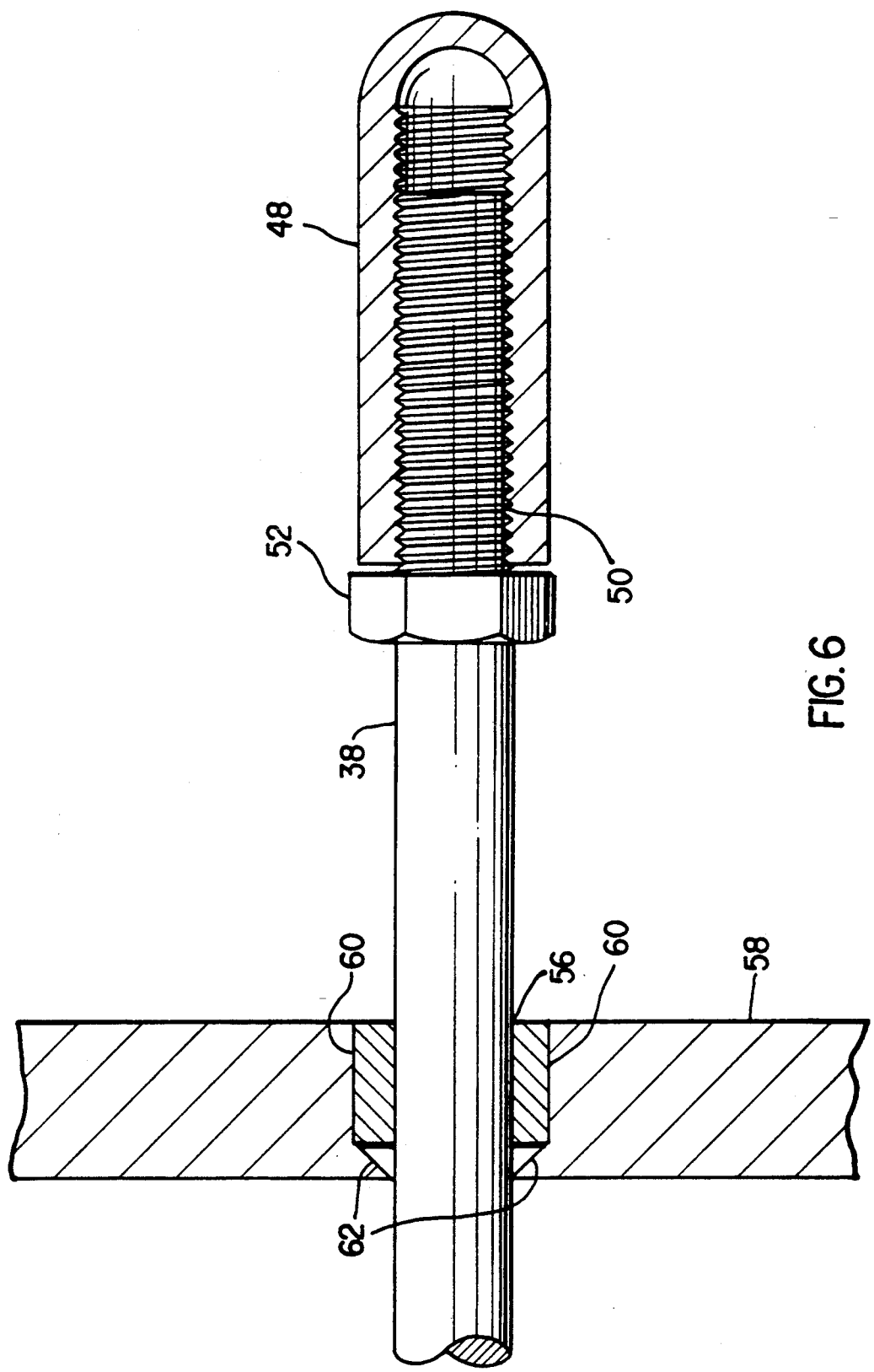
FIG. 6 is an enlarged view, of the portion of the structure of FIG. 1 in which the throw rod exits the clutch master cylinder, on the right end of the clutch master cylinder as seen in FIG. 1, showing a bushing and seal for keeping clutch fluid from leaking out of clutch master cylinder along the throw rod.

As best shown in FIG. 6, the throw rod 38 exits the clutch master cylinder 2 through a hole 56 in the wall 58. The wall 58 may be welded to an otherwise openended clutch master cylinder 2; or it would of course be possible to have clutch master cylinder 2 and wall 58 made from a single piece of metal. In order to prevent clutch fluid from leaking out of clutch master cylinder 2 through hole 56 along the sides of throw rod 38, a brass bushing 60 is provided within hole 56, and a rubber seal 62 is provided on the side of wall 58 facing the interior of clutch master cylinder 2.

Depending upon the stage of operation of the vehicle, brake fluid is to be provided to the wheel brake cylinders 18, 20, 22, and 24 from either brake master cylinder 8, or additional brake master cylinder 34 (not ordinarily from both, except as discussed below). Since the brake lines 40 and 42 and the brake lines 14 and 16 are of necessity joined, through T valve assemblies 44 and 46, before the brake fluid may reach wheel brake cylinders 18, 20, 22, and 24, it is important to provide a means to prevent cross flow of brake fluid from additional brake master cylinder 34 to brake master cylinder 8, or vice versa, since such cross flow would naturally diminish braking power.

In the first embodiment of the invention, shown in FIGS. 1 and 2a-4b, this means is provided by conventional normally open electric solenoid valves 64, 66, 68 and 70, located in T valve assemblies 44 and 46, and associated switching circuitry, the structure and operation of which is shown in FIGS. 1, and 2a-4b.

When brake pedal 12 is depressed, a switch 72 is closed, allowing battery current to flow through a wire 74 (See FIG. 1 for circuitry) leading to solenoid valves 64 and 68, so that these valves are closed, thus preventing flow of brake fluid from brake master cylinder 8 to additional brake master cylinder 34. In this configuration (FIGS. 2a and 2c) the brake fluid from brake master cylinder 8 can only travel through lines 76 and 78 to wheel brake cylinders 18, 20, 22, and 24. Switch 72 is a mechanically operated switch mounted behind brake pedal 12, so as to be closed when brake pedal 12 is depressed, and is connected by a wire to solenoid valves 64 and 68, as indicated above. This configuration should minimize any bleeding of brake fluid from brake master cylinder 8 to additional brake master cylinder 34, since solenoid valves 64 and 68 would in that manner be closed before there is any movement of brake fluid.

Three additional switches and two additional solenoid valves are provided for several situations in which additional brake master cylinder 34 has been activated for braking action:

When applying braking action by sufficient depression of clutch pedal 6 and use of additional brake master cylinder 34, the operator may sometimes depress clutch pedal 6 too far during gear shifting, producing excessive braking action. For this reason, two normally open electric solenoid valves 80 and 82 are provided in brake lines 40 and 42 respectively. These solenoid valves 80 and 82 may be activated by a switch 84, which may be located on the dashboard or gearshift, to close off brake lines 40 and 42, preventing braking action from operation of additional brake master cylinder 34. In this manner the system of the present invention may be turned off when desired.

When the present invention is in operation, however, with solenoid valves 80 and 82 open, and additional brake master cylinder 34 is activated by sufficient depression of clutch pedal 6, the resulting brake fluid pressure in brake line 40 activates a pressure switch 86 in line 40, sending battery current through wire 88, to solenoid valves 66 and 70, closing these valves. In this configuration (FIGS. 3a and 3b) brake fluid is prevented from travelling from additional brake master cylinder 34 to brake master cylinder 8, and may only travel through lines 76 and 78 to wheel brake cylinders 18, 20, 22, and 24.

In the unusual situation, in which the operator has depressed clutch pedal 6 sufficiently to engage additional brake master cylinder 34 and has also depressed brake pedal 12, so that all four of solenoid valves 64, 66, 68 and 70 are closed, it is necessary to allow means for brake fluid to nonetheless pass through these valves to lines 76 and 78 and wheel brake cylinders 18, 20, 22, and 24, since otherwise the vehicle would be deprived of all braking action. This means is provided by having the valve heads 90, 92, 94 and 96 of solenoid valves 64, 66, 68 and 70 fabricated of rubber, so that they may in this situation deflect sufficiently to allow sufficient brake fluid to pass the valves for adequate braking action. Since, in this situation, there can be some migration of brake fluid from one brake cylinder to the other, to prevent excessive overfilling of one cylinder and depletion of the other, lines 98 and 100 allow equalization of fluid to be maintained between the reservoirs 102 and 104 of additional brake master cylinder 34, and reservoirs 106 and 108 of brake master cylinder 8.

As indicated most clearly in FIG. 2b, the lines 40, 42, 14, and 16 join T valve assemblies 44 and 46 through small apertures 110, rather than simply connecting to T valve assemblies 44 and 46 at apertures open for the full width of lines 40, 42, 14, and 16. The reason for having these small apertures, rather than simply having fully open apertures where lines 40, 42, 14, and 16 join T valve assemblies 44 and 46, is to prevent an undesirable cross flow effect that would otherwise occur when one or the other of the brake master cylinders 34 or 8 was activated. When only brake master cylinder 8 is activated, so that the solenoid valves 64, 66, 68 and 70 have the configurations shown in FIGS. 2a and 2c, if the apertures above valve heads 90 and 94 were completely open apertures across the widths of lines 40 and 42, the hydraulic pressure from brake master cylinder 8 would tend to deflect the edges of rubber valve heads 90 and 94 up into lines 40 and 42, respectively, thus allowing cross flow of brake fluid from brake master cylinder 8 to additional brake master cylinder 34. Similarly, when only additional brake master cylinder 34 is activated, so that solenoid valves 64, 66, 68 and 70 have the configurations shown in FIGS. 3a and 3b, open apertures at the lower ends of lines 14 and 16 would allow a similar deflection of the edges of rubber valve heads 92 and 96 up into lines 14 and 16, respectively, allowing undesired cross flow of brake fluid from additional brake master cylinder 34 to brake master cylinder 8.

Use of the small apertures as illustrated in FIG. 2b, at the junctures of lines 40, 42, 14, and 16 with T valve assemblies 44 and 46, prevents this cross flow effect from occurring, in either direction.

Having pressure switch 86 within brake line 40, with solenoid valve 80 between switch 86 and additional brake master cylinder 34, prevents unnecessary wear on solenoid valves 66 and 70, when the system of the present invention has been turned off by use of switch 84, so that brake lines 40 and 42 are closed at solenoid valves 80 and 82. In this situation, even if clutch pedal 6 is pressed all the way to the floorboard, no pressure will reach and activate pressure switch 86, and solenoid valves 66 and 70 will accordingly not be activated, so that unnecessary usage is avoided.

Additional brake master cylinder 34 is detachable from clutch master cylinder 2, by removal of bolts 36, to facilitate repairs of either clutch master cylinder 2 or additional brake master cylinder 34.

Figure 1A:
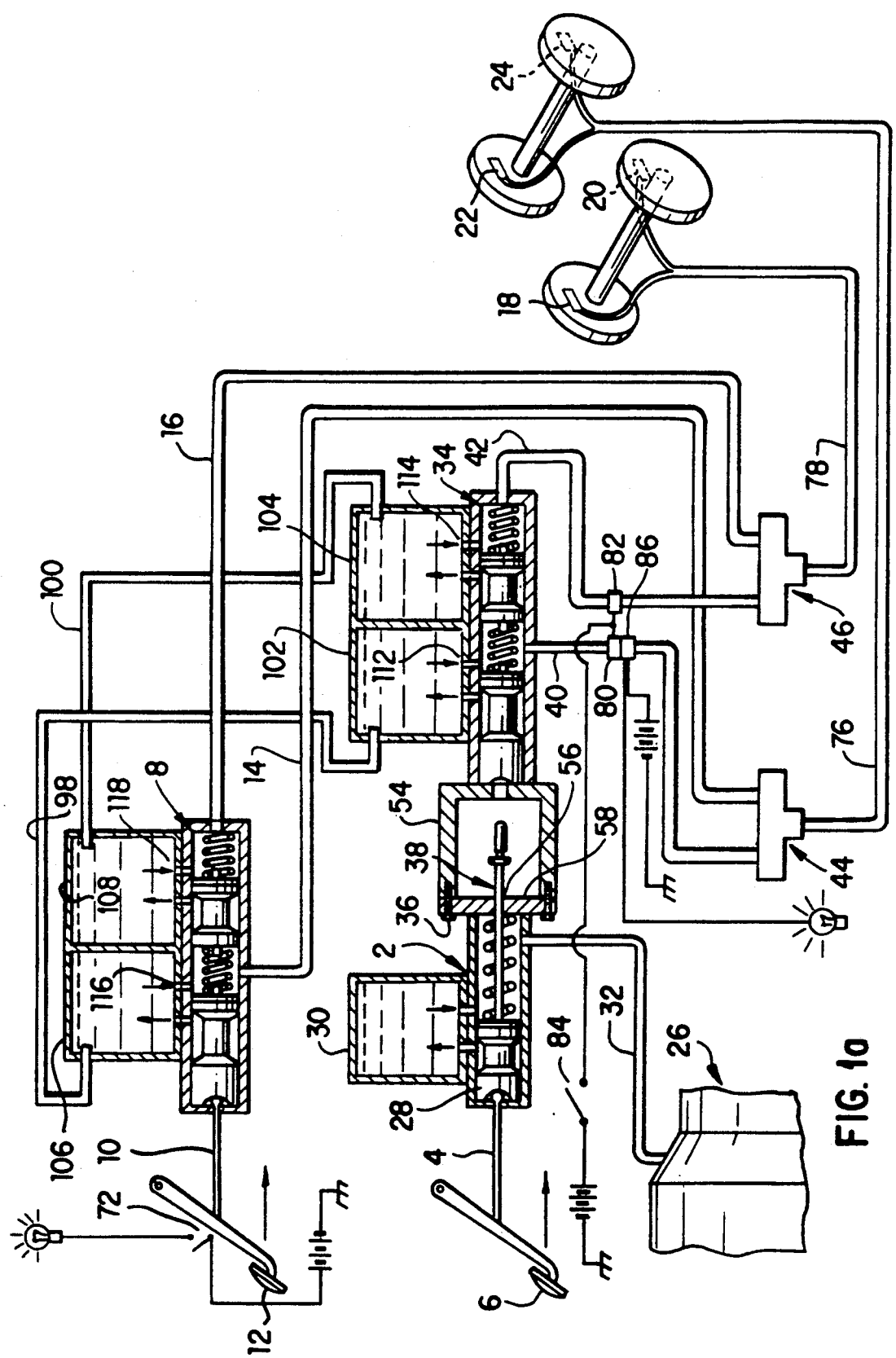
FIG. 1a is a view as in FIG. 1, of an alternate possible embodiment of the invention, lacking the solenoid valves shown in the lower portion of FIG. 1.

An alternative embodiment of the invention is illustrated in FIG. 1a. In this embodiment the T valve assemblies 44 and 46 lack any solenoid valves, and the function of preventing undesired cross flow between the brake master cylinder 8 and the additional brake master cylinder 34 is instead performed by the use of one-way valves 112 and 114 which allow hydraulic fluid to flow, respectively, from reservoirs 102 and 104 of additional brake master cylinder 34, into additional brake master cylinder 34 but not in the opposite direction; and by the use of one-way valves 116 and 118, which allow hydraulic fluid to flow, respectively, from reservoirs 106 and 108 of brake master cylinder 8, into brake master cylinder 8 but not in the opposite direction. The use of these one-way valves minimizes the undesired cross flow between the two brake master cylinders, since, in order for fluid from one of the brake master cylinders to enter the other brake master cylinder, there would have to be a path of egress of fluid within the cylinder to one of the attached reservoirs, and any such egress is prevented by use of the one way valves. It is anticipated that in the first embodiment of the invention, shown in FIG. 1, it would not be necessary to employ said one way valves, because the solenoid valves 64, 66, 68 and 70 should perform the same function of preventing the undesired cross flow. However, if it is found that the solenoid valves 64, 66, 68 and 70 are not by themselves sufficient to completely eliminate the cross flow, then the one way valves could be used also in this configuration.

Those familiar with the art will appreciate that the invention may be employed in specific configurations other than that of the preferred embodiment, without departing from the essential substance of the invention.

For example, and not by way of limitation, it would of course be possible to manufacture clutch master cylinder 2 and additional brake master cylinder 34 as one joint clutch/brake cylinder, for installation in a new vehicle (in addition to brake master cylinder 8), rather than retrofiting additional brake master cylinder 34 to an existing clutch master cylinder 2, as in the preferred embodiment.

Although the preferred embodiment employs the throw rod 38, having an adjustable length, as the means whereby further depression of clutch pedal 6 can activate additional brake master cylinder 34, after clutch pedal 6 has been depressed sufficiently to disengage the clutch, it would of course be possible to employ other means instead, to perform the same function. For example, a spring located between clutch master cylinder 2 and additional brake master cylinder 34, could be compressed by a shorter throw rod of fixed length, to gradually apply increasing pressure to activate additional brake master cylinder 34, as clutch pedal 6 was further depressed.

Similarly there are of course other means whereby the effective length of throw rod 38 could be varied, other than the use of threaded end portion 48 and matching threads 50 employed in the preferred embodiment. For example, it would be possible instead to create a throw rod of adjustable length by using two concentric members which slide longitudinally relative to one another, and which may be locked at various positions by use of a locking pin fitting through matching holes of the two members,.

Similarly, although the above-described embodiments employ T valve assemblies 44 and 46 and their associated circuitry and switches, described above, as the means to prevent unwanted cross flow of brake fluid between brake master cylinder 8 and additional brake master cylinder 34, other equivalent means could of course be employed instead. For example, although more complicated, it would be possible to use similar T valve assemblies located just before each of the wheel brake cylinders 18, 20, 22, and 24, which would join brake lines extending to each wheel from each of the brake master cylinders, with solenoid valves operated by switching circuitry as described above.

The essential characteristics of the invention are defined by the following claims.

I claim:

1. Brake and clutch system for a manual transmission motor vehicle having wheels comprising:
   (a) a clutch master cylinder;
   (b) a clutch pedal linkage means, connected to a clutch pedal and to said clutch master cylinder, for activating said clutch master cylinder when said clutch pedal is depressed;
   (c) a clutch disengagement means, connected to said clutch master cylinder and to a clutch in a transmission of said vehicle, for disengaging said clutch when said clutch master cylinder is activated;
   (d) a brake master cylinder;
   (e) a brake pedal linkage means, connected to a brake pedal and to said brake master cylinder, for activating said brake master cylinder when said brake pedal is depressed;
   (f) a brake fluid conveyance means, connected to said brake master cylinder and to a wheel brake cylinder located at each wheel of said vehicle, for conveying brake fluid from said brake master cylinder to said wheel brake cylinder;
   (g) an additional brake master cylinder, connected to said clutch master cylinder;
   (h) clutch and brake linkage means, connected to said clutch pedal, to said clutch master cylinder, and to said additional brake master cylinder, for activating said additional brake master cylinder when said clutch pedal is sufficiently depressed;
   (i) additional brake fluid conveyance means, connected to said additional brake master cylinder and to said wheel brake cylinders, for conveying hydraulic brake fluid from said additional brake master cylinder to said wheel brake cylinders; and
   (j) cross flow prevention means, connected to said brake fluid conveyance means and to said additional brake fluid conveyance means, for preventing cross flow of said hydraulic brake fluid between said brake master cylinder and said additional brake master cylinder.

2. Brake and clutch system of claim 1, wherein said clutch and brake linkage means further comprises an adjustment means, connected to said clutch and brake linkage means, for adjusting the position of said clutch pedal at which further depression of said clutch pedal causes said clutch and brake linkage means to activate said additional brake master cylinder.

3. Brake and clutch system of claim 2, wherein said additional brake master cylinder is installed behind said clutch master cylinder, and wherein said clutch and brake linkage means comprises a throw rod, extending from said clutch master cylinder toward said additional brake master cylinder, and wherein said adjustment means comprises a means for adjustment of the length of said throw rod within a range of lengths such that said throw rod may be made to extend into and activate said additional brake master cylinder for positions of said clutch pedal below the position at which said clutch is fully disengaged.

4. Brake and clutch system of claim 3, wherein said means for adjustment of the length of said throw rod comprises a principal portion of said throw rod having a threaded end; a further cylindrical portion of said throw rod having a cylindrical interior void and having interior threads matching said threaded end of said principal portion of said throw rod, said further cylindrical portion of said throw rod being threadably engaged upon said threaded end of said principal portion of said throw rod; and locking means, connected to said further cylindrical portion of said throw rod and to said principal portion of said throw rod, for locking said further cylindrical portion of said throw rod to said principal portion of said throw rod at a desired length of said throw rod.

5. Brake and clutch system of claims 1, 2, 3, or 4, wherein said brake fluid conveyance means and said additional brake fluid conveyance means each comprise at least one hydraulic brake line, and in which said cross flow prevention means comprises at least one T valve assembly whereat said hydraulic brake lines join before reaching said wheel brake cylinders, each said T valve assembly further comprising valve means, for allowing brake fluid from said brake master cylinder and from said additional brake master cylinder to flow to said wheel brake cylinder, and wherein said cross flow prevention means further comprises a first sensor and control means, connected to said brake master cylinder, for sensing when said brake master cylinder has been activated, and for controlling said valve means in such fashion as to prevent brake fluid from flowing from said brake master cylinder through said valve means to said additional brake master cylinder when said brake master cylinder has been activated, and a second sensor and control means, connected to said additional brake master cylinder and to said valve means, for sensing when said additional brake master cylinder has been activated and for controlling said valve means in such fashion as to prevent brake fluid from flowing from said additional brake master cylinder through said valve means to said brake master cylinder when said additional brake master cylinder has been activated.

6. Brake and clutch system of claims 5, wherein there are two of said T valve assemblies.

7. Brake and clutch system of claims 1, 2, 3, or 4, further comprising shutoff means, connected to said additional brake fluid conveyance means, for interrupting the flow of said brake fluid from said additional brake master cylinder through said additional brake fluid conveyance means, when it is desired to cease operation of said brake and clutch system.

8. Brake and clutch system of claims 1, 2, 3, or 4, wherein said brake fluid conveyance means and said additional brake fluid conveyance means each comprise at least one hydraulic brake line, and in which said cross flow prevention means comprises means, connected to said brake master cylinder and to said additional brake master cylinder, for preventing said hydraulic brake fluid from said brake master cylinder from entering said additional brake master cylinder, and for preventing said hydraulic brake fluid from said additional brake master cylinder from entering said brake master cylinder.

9. Brake and clutch system of claim 5, wherein said cross flow prevention means further comprises means, connected to said brake master cylinder and to said additional brake master cylinder, for preventing said hydraulic brake fluid from said brake master cylinder from entering said additional brake master cylinder, and for preventing said hydraulic brake fluid from said additional brake master cylinder from entering said brake master cylinder.

* * * * *